US006638998B2

(12) United States Patent
Zhao et al.

(10) Patent No.: US 6,638,998 B2
(45) Date of Patent: Oct. 28, 2003

(54) USE OF SURFACTANTS FOR IMPROVING THE COMPATIBILITY OF INORGANIC PIGMENTS IN AQUEOUS COATING COMPOSITIONS

(75) Inventors: Cheng-Le Zhao, Charlotte, NC (US); Uwe Dittrich, Dannstadt (DE)

(73) Assignee: BASF AG, Ludwigshafen (DE)

( * ) Notice: Subject to any disclaimer, the term of this patent is extended or adjusted under 35 U.S.C. 154(b) by 144 days.

(21) Appl. No.: 09/837,034

(22) Filed: Apr. 18, 2001

(65) Prior Publication Data

US 2003/0022970 A1 Jan. 30, 2003

(51) Int. Cl.$^7$ .............. C08J 3/00; C08K 5/52; C08L 101/00
(52) U.S. Cl. ...................... 524/127; 524/141
(58) Field of Search .................. 524/127, 141

(56) References Cited

U.S. PATENT DOCUMENTS

| 4,101,490 | A | 7/1978 | Pons et al. | |
| 4,110,285 | A | 8/1978 | Pons et al. | |
| 4,477,623 | A | 10/1984 | Pons et al. | |
| 4,702,861 | A | 10/1987 | Farnum | |
| 4,927,463 | A | 5/1990 | Kloetzer et al. | 106/109 |
| 5,288,780 | A | 2/1994 | Jarzombek et al. | |
| 5,385,960 | A | 1/1995 | Emmons et al. | |
| 5,670,561 | A | 9/1997 | Scheibelhoffer et al. | 523/351 |
| 5,770,303 | A | 6/1998 | Weinert et al. | |
| 5,969,018 | A | 10/1999 | Shah et al. | 524/140 |
| 6,080,802 | A | 6/2000 | Emmons et al. | |
| 6,348,528 | B1 | 2/2002 | Schlarb et al. | 524/141 |

FOREIGN PATENT DOCUMENTS

| GB | 1189560 | 4/1970 | |
| GB | 1220937 | 1/1971 | |
| WO | WO 93/11181 | 6/1993 | |
| WO | WO 93/12184 | 6/1993 | |
| WO | WO 99/46337 | 9/1999 | C09D/5/02 |

OTHER PUBLICATIONS

"Phosphate Esters in Emulsion Polymerization", from www.dexterchem.com, 2 pages, no date.
"Strodex™ and Dextrol® Surfactants for Paint & Coatings", from www.dexterchem.com, 2 pages, no date.
"acid Anhydride Surfactants for Paint & Coatings", from www.dexterchem.com, 2 pages, no date.
"Neutralized Surfactants for Paint & Coatings", from www.dexterchem.com, 2 pages, no date.
"Typical Coating Formulations", from www.dexterchem.com, 3 pages, no date.
Cimbar Performance Minerals, "Suspengel High Purity Bentonite", 4 pages, revised Jun. 2001.
Chevalier et al.; *Polyoxyethylene di–phosphonates as dispersing agents*, 4$^{th}$ North American Research Conference on Organic Coatings; Nov. 11–13, 1996; Hilton Head Island, SC.

*Primary Examiner*—Patrick D. Niland
(74) *Attorney, Agent, or Firm*—Andrew T. Meunier (57) ABSTRACT

The present invention is an aqueous coating composition and method of preparing same that uses certain polyoxyalkylene phosphate surfactants to increase the compatibility of inorganic pigments such as $TiO_2$ with latex polymer binders to reduce the clustering of the inorganic pigment particles in the aqueous coating composition. The aqueous coating composition of the invention includes at least one polyoxyalkylene phosphate surfactant having the following structure:

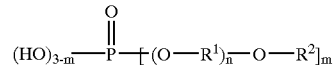

wherein m is 1 or 2, n is an integer from 1 to 100, $R^1$ is C1–C5 alkyl, O—$R^2$ is an alkylphenol residue wherein $R^2$ has the structure $C_6H_4$—$C_pH_{2p+1}$ or O—$R^2$ is a linear or branched alkyl alcohol residue wherein $R^2$ has the structure $C_pH_{2p+1}$, and p is an integer from 1 to 30. The aqueous composition further includes at least one latex polymer, at least one inorganic pigment and water.

44 Claims, 7 Drawing Sheets

USE OF SURFACTANTS FOR IMPROVING THE COMPATIBILITY OF INORGANIC PIGMENTS IN AQUEOUS COATING COMPOSITIONS

FIELD OF THE INVENTION

The present invention relates to the use of surfactants for improving the compatibility of inorganic pigments such as titanium dioxide in aqueous coating compositions such as paint and paper coating compositions. In particular, the present invention related to the use of certain alkoxylated phosphorous-based surfactants for improving the compatibility of inorganic pigments and latex binders in aqueous paint and paper coating compositions.

BACKGROUND OF THE INVENTION

Because of its unique ability to provide maximum light scattering with virtually no light absorption, titanium dioxide ($TiO_2$) is widely used as a pigment to achieve high opacity (or hiding power) and brightness in white and colored paints, and in other coating compositions. Historically, $TiO_2$ was produced and used as a dry powder. However, there are a number of problems associated with using $TiO_2$ powder in the manufacture of coating compositions. In particular, the use of $TiO_2$ powder can result in dusting and spillage, both of which not only result in pigment loss but also in an unhealthy work environment. Furthermore, the handling of the standard 25-kg bags of $TiO_2$ powder can lead to extensive exposure to forklift and hand truck hazards, back-related injuries, and other job-related injury risks.

In addition to these problems, $TiO_2$ powders typically must be ground to be used in coating compositions such as paint compositions. This grinding step is highly power intensive. Moreover, the grinding step can be very time-consuming thereby decreasing the rate at which the $TiO_2$ powders can be used.

As an alternative to $TiO_2$ powders, $TiO_2$ slurries were first introduced to the paper industry in the late 1960's and to the paint industry in the early 1970's. $TiO_2$ slurries are usually high solids content, e.g., from 60 to 80% by weight, aqueous dispersions of $TiO_2$ that are stable over a long period of time.

To minimize the settling and aggregation of $TiO_2$ particles in slurries, dispersants are often used in $TiO_2$ slurries. The conventional dispersants used in $TiO_2$ slurries include organic polyelectrolytes, 2-amino-2-methyl-1-propanol, triethanolamine, and sodium salts of polymeric carboxylic acids. In addition to dispersants, biocides are also used in $TiO_2$ slurries to preserve the slurries.

The introduction of $TiO_2$ slurries overcame many of the problems associated with the use of $TiO_2$ powders and particularly the power intensive and time-consuming step of grinding the $TiO_2$ powders. Therefore, the use of a $TiO_2$ slurry results in a significant increase in productivity over the use of $TiO_2$ powders. Nevertheless, despite the significant advantages of using $TiO_2$ slurries in aqueous coating compositions such as paper and latex paint compositions, performance deficiencies do exist when using $TiO_2$ slurries compared with $TiO_2$ powders. Specifically, it is known, for example, that $TiO_2$ slurries are often incompatible with the latex binder used in the aqueous coating composition. This problem manifests itself in the form of $TiO_2$ particle clustering in the paint, which reduces the light scattering efficiency of the pigment, or in the form of lower gloss due to the presence of an incompatible dispersant in the slurry.

Therefore, there is a need in the art to improve the compatibility of $TiO_2$ slurries and latex binders to limit the clustering of $TiO_2$ particles and the reduction of gloss in aqueous coating compositions. Moreover, there is a need in the art to improve the compatibility of other inorganic pigments in aqueous compositions.

SUMMARY OF THE INVENTION

It has been found that the use of certain polyoxyalkylene phosphate surfactants in aqueous coating compositions limits the clustering of $TiO_2$ particles in these coating compositions, particularly $TiO_2$ particles added to the compositions in slurry form. In particular, the aqueous coating composition of the invention includes at least one polyoxyalkylene phosphate surfactant having the following structure:

wherein m is 1 or 2, n is an integer from 1 to 100, $R^1$ is C1–C5 alkyl, O—$R^2$ is an alkylphenol residue wherein $R^2$ has the structure $C_6H_4$—$C_pH_{2p+1}$ or O—$R^2$ is a linear or branched alkyl alcohol residue wherein $R^2$ has the structure $C_pH_{2p+1}$, and p is an integer from 1 to 30. The aqueous composition further includes at least one latex polymer, at least one inorganic pigment and water.

In a preferred embodiment of the invention, the surfactant includes a polyoxyethylene phosphate surfactant, i.e., $R^1$ is ethyl. Moreover, preferably n is from 2 to 30 and more preferably from 3 to 15. For $R^2$, p is preferably an integer from 8 to 18 and, in a particularly preferred embodiment, $R^2$ is nonylphenyl or tridecyl. The at least one inorganic pigment is preferably selected from the group consisting of $TiO_2$ and $CaCO_3$. The at least one latex polymer is preferably selected from the group consisting of pure acrylics, styrene acrylics, vinyl acrylics and acrylated ethylene vinyl acetate copolymers and more preferably includes a pure acrylic such as a butyl acrylate/methyl methacrylate copolymer. The surfactant discussed above can be incorporated in the latex by using it to produce the latex or it can be added separate from the latex to the aqueous coating composition. The aqueous coating composition can further include at least one anti-freezing agent and one or more additives selected from the group consisting of plasticizers, drying retarders, dispersants, surfactants or wetting agents, rheology modifiers, defoamers, thickeners, coalescing agents, biocides, mildewcides, colorants, waxes, perfumes and co-solvents.

In one preferred embodiment of the invention, the aqueous coating composition is an acrylic latex paint composition, comprising at least one polyoxyalkylene phosphate surfactant as described above; at least one acrylic latex polymer derived from at least one acrylic monomer selected from the group consisting of acrylic acid, acrylic acid esters, methacrylic acids, and methacrylic acid esters; titanium dioxide and water. For example, the at least one acrylic latex polymer can be selected from the group consisting of pure acrylics, styrene acrylics, vinyl acrylics and acrylated ethylene vinyl acetate copolymers and is more preferably a pure acrylic.

The present invention further includes a method of preparing an aqueous coating composition. Specifically, at least one polyoxyalkylene phosphate surfactant as described above, at least one latex polymer, and at least one inorganic pigment are mixed to produce the aqueous coating composition. Preferably, the at least one inorganic pigment is in slurry form. The at least one inorganic pigment is preferably selected from the group consisting of $TiO_2$ and $CaCO_3$. The at least one latex polymer is preferably selected from the group consisting of pure acrylics, styrene acrylics, vinyl acrylics and acrylated ethylene vinyl acetate copolymers, and more preferably includes a pure acrylic. At least one anti-freezing agent and at least one additive selected from the group consisting of plasticizers, drying retarders, dispersants, surfactants or wetting agents, rheology modifiers, defoamers, thickeners, coalescing agents, biocides, mildewcides, colorants, waxes, perfumes and co-solvents, can also be mixed in the composition.

The method can further include the step of preparing the polymer latex binder using emulsion polymerization by feeding monomers to a reactor in the presence of at least one initiator and the at least one surfactant described above and polymerizing the monomers to produce the latex binder. The resulting latex binder can then be mixed with the at least one inorganic pigment to produce the aqueous coating composition. The step of preparing the polymer latex binder can include the steps of preparing an initiator solution comprising the initiator, preparing a monomer pre-emulsion comprising monomers and the surfactant, adding the initiator solution to a reactor and adding the monomer pre-emulsion to the reactor. Preferably, at least a portion of the initiator solution is added to the reactor prior to adding the monomer pre-emulsion. In addition, a seed latex is preferably added to the reactor prior to adding the initiator and adding the monomer pre-emulsion. Once the polymer latex binder is prepared, the latex binder is preferably chemically stripped by adding a peroxide and a reducing agent to the latex binder thereby decreasing the residual monomer content of the latex binder. The monomers fed to a reactor to prepare the polymer latex binder preferably include at least one acrylic monomer selected from the group consisting of acrylic acid, acrylic acid esters, methacrylic acids, and methacrylic acid esters. In addition, the monomers can include one or more monomers selected from the group consisting of styrene, α-methyl styrene, vinyl chloride, acrylonitrile, methacrylonitrile, ureido methacrylate, vinyl acetate, itaconic acid, crotonic acid, maleic acid, fumaric acid, ethylene, and C4–C8 conjugated dienes such as 1,3-butadiene, isoprene or chloroprene. Preferably, the monomers include one or more monomers selected from the group consisting of n-butyl acrylate, methyl methacrylate, styrene and 2-ethylhexyl acrylate.

By adding the surfactants discussed above, there is little or no clustering of the $TiO_2$ particles or other inorganic pigment particles in the aqueous coating compositions of the invention as evidenced, e.g., by cryogenic scanning electron micrograph (SEM) analysis. Therefore, the aqueous coating composition maintains better dispersion of the $TiO_2$ particles or other inorganic pigment particles than conventional compositions that do not use the surfactants of the invention. Semi gloss paint formulations prepared in accordance with the invention also have excellent high shear viscosities, low shear viscosities, gloss and hiding power and show improvements in these properties over conventional formulations.

These and other features and advantages of the present invention will become more readily apparent to those skilled in the art upon consideration of the following detailed description and accompanying figures, which describe both the preferred and alternative embodiments of the present invention.

DETAILED DESCRIPTION OF THE PREFERRED EMBODIMENTS

In the following detailed description, preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description and accompanying figures.

The present invention is a aqueous coating composition that provides excellent dispersion of $TiO_2$ particles and other inorganic pigment particles. The aqueous coating composition of the invention includes at least one particular polyoxyalkylene phosphate surfactant, at least one latex polymer, at least one inorganic pigment and water.

The polyoxyalkylene phosphate surfactant of the invention has the structure:

wherein m is 1 or 2, n is an integer from 1 to 100, R' is C1–C5 alkyl, O—$R^2$ is an alkylphenol residue wherein $R^2$ has the structure $C_6H_4$—$C_pH_{2p+1}$ or O—$R^2$ is a linear or branched alkyl alcohol residue wherein $R^2$ has the structure $C_pH_{2p+1}$, and p is an integer from 1 to 30. $R^1$ is typically ethyl, propyl, or a combination thereof, and is more preferably ethyl to produce an ethoxylated phosphate surfactant. In the formula above, m is 1 or 2 and typically the surfactants of the invention include a combination of molecules where m is 1 and molecules where m is 2. Further, in the formula above, n is preferably from 2 to 30 and more preferably from 3 to 15. $C_pH_{2p+1}$ can be a linear or branched alkyl group and p is preferably an integer from 8 to 18.

In a particularly preferred embodiment, $R^2$ is nonylphenyl or tridecyl. Accordingly, the polyoxyethylene phosphate surfactant preferably has the structure:

wherein m is 1 or 2, n is an integer from 2 to 30, and R is nonylphenol or tridecyl. Suitable surfactants for use in the invention include DEXTROL® OC-110, DEXTROL® OC-15, DEXTROL® OC-22, DEXTROL® OC-40, DEXTROL® OC-60 and DEXTROL® OC-75A, commercially available from Dexter Chemical L.L.C, and POLYSTEP® P-31, POLYSTEP® P-32, POLYSTEP® P-33 and POLYSTEP® P-34, commercially available from Stepan Company. The surfactant is typically present in the aqueous coating composition in an amount from greater than 0 to about 4% by weight based on polymer weight, more preferably from about 0.1 to about 2% by weight based on polymer weight.

As mentioned above, the aqueous coating composition includes at least one inorganic pigment. The term "inorganic pigment" as used herein includes non-film-forming solids such as inorganic pigments, extenders, and fillers. The at least one inorganic pigment is preferably selected from the group consisting of $TiO_2$ (in both anastase and rutile forms), clay (aluminum silicate), $CaCO_3$ (in both ground and precipitated forms), talc (magnesium silicate), barytes (barium sulfate), zinc oxide, zinc sulfite, and the like. More preferably, the inorganic pigment includes $TiO_2$ and/or $CaCO_3$. Generally, the mean particle sizes of the inorganic pigments range from about 0.01 to about 50 microns. For example, the $TiO_2$ particles used in the aqueous coating composition (e.g. provided by the slurry) typically have a mean particle size of from about 0.15 to about 0.40 microns. The inorganic pigment (e.g. $TiO_2$ and/or $CaCO_3$) is preferably added to the aqueous coating composition in slurry form. Exemplary $TiO_2$ slurries for use in the invention include TI-PURE® R-746 and R-942, commercially available from DuPont; TIOXIDE® RCS-535, RCS-9 and R-HD6X, commercially available from Huntsman Corp.; and KRONOS® 4102, commercially available from Kronos, Inc. The inorganic pigment is preferably present in the aqueous coating composition in an amount from about 5 to about 40 percent by weight, more preferably from about 10 to about 30 percent by weight (based on the weight of the inorganic pigment, not the weight of the slurry).

The at least one latex polymer used in the aqueous coating composition is preferably derived from monomers comprising at least one acrylic monomer selected from the group consisting of acrylic acid, acrylic acid esters, methacrylic acids, and methacrylic acid esters. In addition, the latex polymer can optionally include one or more monomers selected from the group consisting of styrene, α-methyl styrene, vinyl chloride, acrylonitrile, methacrylonitrile, ureido methacrylate, vinyl acetate, itaconic acid, crotonic acid, maleic acid, fumaric acid, and ethylene. It is also possible to include C4–C8 conjugated dienes such as 1,3-butadiene, isoprene and chloroprene. Preferably, the monomers include one or more monomers selected from the group consisting of n-butyl acrylate, methyl methacrylate, styrene and 2-ethylhexyl acrylate. The latex polymer is typically selected from the group consisting of pure acrylics (comprising acrylic acid, methacrylic acid, an acrylate ester, and/or a methacrylate ester as the main monomers), styrene acrylics (comprising styrene and acrylic acid, methacrylic acid, an acrylate ester, and/or a methacrylate ester as the main monomers), vinyl acrylics (comprising vinyl acetate and acrylic acid, methacrylic acid, an acrylate ester, and/or a methacrylate ester as the main monomers) and acrylated ethylene vinyl acetate copolymers (comprising ethylene, vinyl acetate and acrylic acid, methacrylic acid, an acrylate ester, and/or a methacrylate ester as the main monomers). The monomers can also include other main monomers such as acrylamide and acrylonitrile, and one or more functional monomers such as itaconic acid and ureido methacrylate, as would be readily understood by those skilled in the art. In a particularly preferred embodiment, the latex polymer is a pure acrylic such as a butyl acrylate/methyl methacrylate copolymer derived from monomers including butyl acrylate and methyl methacrylate. The latex polymer dispersion preferably includes from about 30 to about 75% solids and a mean latex particle size of from about 70 to about 650 nm. The latex polymer is preferably present in the aqueous coating composition in an amount from about 5 to about 60 percent by weight, and more preferably from about 8 to about 40 percent by weight (based on the weight of the latex polymer and not the latex dispersion).

The aqueous coating composition can optionally further include at least one anti-freezing agent to improve the freeze-thaw stability of the composition such as propylene glycol, ethylene glycol and diethylene glycol. More preferably, propylene glycol is used. The anti-freezing agent is typically present in the aqueous coating composition in an amount of from 0 to about 15% by weight, more preferably from about 1 to about 10% by weight, based on the total weight of the aqueous coating composition.

The coating composition can optionally contain additives such as one or more film-forming aids. Suitable firm-forming aids include plasticizers and drying retarders such as high boiling point polar solvents. Other conventional coating additives such as, for example, dispersants, additional surfactants or wetting agents, rheology modifiers, defoamers, thickeners, coalescing agents, biocides, mildewcides, colorants such as colored pigments and dyes, waxes, perfumes, co-solvents, and the like, can also be used in accordance with the invention. These additives are typically present in the aqueous coating composition in an amount from 0 to about 15% by weight, more preferably from about 1 to about 10% by weight.

The balance of the aqueous coating composition of the invention is water. Although much of the water is present in the polymer latex dispersion, in the inorganic pigment slurry, and in other components of the aqueous coating composition, water is generally also added separately to the aqueous coating composition. Typically, the aqueous coating composition includes from about 10% to about 85% by weight and more preferably from about 50% to about 80% by weight water. Stated differently, the total solids content of the aqueous coating composition is typically from about 15% to about 90%, more preferably, from about 20% to about 50%.

The coating compositions are typically formulated such that the dried coatings comprise at least 10% by volume of dry polymer solids, and additionally 5 to 90% by volume of non-polymeric solids in the form of inorganic pigments. The dried coatings can also include additives such as plasticizers, dispersants, surfactants or wetting agents, rheology modifiers, defoamers, thickeners, biocides, mildewcides, colorants, waxes, and the like, that do not evaporate upon drying of the coating composition.

In one preferred embodiment of the invention, the aqueous coating composition is a latex paint composition comprising at least one polyoxyalkylene phosphate surfactant as described above; at least one latex polymer derived from at least one acrylic monomer selected from the group consisting of acrylic acid, acrylic acid esters, methacrylic acids, and methacrylic acid esters; titanium dioxide and water. As mentioned above, the at least one latex polymer can be a pure acrylic, a styrene acrylic, a vinyl acrylic or an acrylated ethylene vinyl acetate copolymer.

The present invention further includes a method of preparing a aqueous coating composition by mixing at least one polyoxyalkylene phosphate surfactant as described above, at least one latex polymer, and at least one inorganic pigment. Preferably, the at least one inorganic pigment is in slurry form and the latex polymer is in the form of a latex polymer dispersion. Typically, the surfactant is either used to produce the latex polymer dispersion as discussed below or is mixed with the latex polymer dispersion prior to mixing the inorganic pigment with the surfactant and latex polymer to produce the aqueous coating composition of the invention. Alternatively, the at least one polyoxyalkylene phosphate surfactant described above can be mixed with the at least one inorganic pigment in slurry form and the resultant mixture then mixed with the latex polymer dispersion. The additives discussed above can be added in any suitable order to either the surfactant, the latex polymer, the inorganic pigment, or combinations thereof, to provide these additives in the aqueous coating composition. In the case of paint formulations, the aqueous coating composition preferably has a pH of from 7 to 10.

The phosphate surfactant of the invention can be used to produce the polymer latex binder for the aqueous coating composition. In particular, the polymer latex binder can be prepared using emulsion polymerization by feeding the monomers used to form the latex binder to a reactor in the presence of at least one initiator and the at least one of the phosphate surfactants of the invention and polymerizing the monomers to produce the latex binder. The monomers fed to a reactor to prepare the polymer latex binder preferably include at least one acrylic monomer selected from the group consisting of acrylic acid, acrylic acid esters, methacrylic acids, and methacrylic acid esters. In addition, the monomers can include styrene, vinyl acetate, or ethylene. The monomers can also include one or more monomers selected from the group consisting of styrene, α-methyl styrene, vinyl chloride, acrylonitrile, methacrylonitrile, ureido methacrylate, vinyl acetate, itaconic acid, crotonic acid, maleic acid, fumaric acid, and ethylene. It is also possible to include C4–C8 conjugated dienes such as 1,3-butadiene, isoprene or chloroprene. Preferably, the monomers include one or more monomers selected from the group consisting of n-butyl acrylate, methyl methacrylate, styrene and 2-ethylhexyl acrylate. The initiator can be any initiator known in the art for use in emulsion polymerization such as ammonium persulfate.

The polymer latex binder can be produced by first preparing an initiator solution comprising the initiator and water. A monomer pre-emulsion is also prepared comprising at least a portion of the monomers to be used to form the latex polymer, one or more surfactants, water, and additional additives such as NaOH. The one or more surfactants in the monomer pre-emulsion preferably include the surfactant of the invention described above. The initiator solution and monomer pre-emulsion are then continuously added to the reactor over a predetermined period of time (e.g. 2–5 hours) to cause polymerization of the monomers and to thereby produce the latex polymer. Preferably, at least a portion of the initiator solution is added to the reactor prior to adding the monomer pre-emulsion. Prior to the addition of the initiator solution and the monomer pre-emulsion, a seed latex such as a polystyrene seed latex can be added to the reactor. In addition, water, one or more surfactants, and any monomers not provided in the monomer pre-emulsion can be added to the reactor prior to adding the initiator and adding the monomer pre-emulsion. The reactor is operated at an elevated temperature at least until all the monomers are fed to produce the polymer latex binder. Once the polymer latex binder is prepared, it is preferably chemically stripped thereby decreasing its residual monomer content. Preferably, it is chemically stripped by continuously adding a peroxide (e.g. t-butylhydroperoxide) and a reducing agent (e.g. sodium acetone bisulfite) to the latex binder at an elevated temperature and for a predetermined period of time (e.g. 0.5 hours). The pH of the latex binder can then be adjusted and a biocide or other additives added after the chemical stripping step.

The aqueous coating composition is a stable fluid that can be applied to a wide variety of materials such as, for example, paper, wood, concrete, metal, glass, ceramics, plastics, plaster, and roofing substrates such as asphaltic coatings, roofing felts, foamed polyurethane insulation; or to previously painted, primed, undercoated, worn, or weathered substrates. The aqueous coating composition of the invention can be applied to the materials by a variety of techniques well known in the art such as, for example, brush, rollers, mops, air-assisted or airless spray, electrostatic spray, and the like.

The present invention will now be further described by the following non-limiting examples.

EXAMPLE 1 (E1)

Example 1 illustrates the preparation of a polymer dispersion containing 1% (weight percent of active material based on dry polymer weight) DEXTROL® OC-110 (Dexter Chemical L.L.C.). DEXTROL® OC-110 is a mixture of compounds I and II below:

A monomer pre-emulsion was prepared by emulsifying 336.7 parts water, 5.3 parts CALSOFT® L-40 (a sodium linear or branched alkyl benzene sulfonate surfactant commercially available from Pilot Chemical), 10.0 parts DEXTROL® OC-110, 13.3 parts TEXAPON® K1296 (a sodium lauryl sulfate surfactant commercially available from Cognis Corporation), 18 parts NaOH solution (10% solution in water), 5 parts itaconic acid, 25 parts acrylamide solution (50% in water), 5 parts acrylic acid, 48 parts ureido methacrylate solution (25% solution in methyl methacrylate), 460 parts n-butyl acrylate and 464.5 parts methyl methacrylate. The initiator solution was prepared by dissolving 2.0 parts ammonium persulfate in 38.0 parts water. A 2-liter stirred glass reactor filled with 498.0 parts deionized water, 3.14 parts of a 33% polystyrene seed latex and 5.0 parts itaconic acid, was purged with nitrogen and heated to 85° C. When the temperature was reached, 4 parts of the initiator solution was injected into the reactor and the remaining initiator solution was continuously fed into the reactor over 3.1 hours. After the charge of the 4 parts of initiator solution, the monomer pre-emulsion was continuously fed into the reactor over 3.0 hours. At the end of the initiator feed, 4.4 parts concentrated ammonia (25% in water) was added into the reactor. The reaction was further allowed to continue for 30 minutes before being cooled down to 70° C.

To further reduce the residual monomer level, a chemical stripping step was conducted. A peroxide solution was prepared consisting of 1.43 parts of t-butylhydroperoxide solution (tBHP, 70% in water) and 25.2 parts water. In addition, a reducing agent solution was prepared consisting of 6.7 parts of sodium acetone bisulfite solution (SABS solution, 24% in water) and 19.9 parts water. The peroxide and reducing agent solutions were fed separately and continuously to the reactor over 0.5 hours. After both feeds, the reactor was maintained at 70° C. for 30 minutes before being cooled down to below 40° C. The pH of the latex was adjusted to 8.6 with concentrated ammonia. 100 ppm (parts per million) of ACTICIDE® MV14 (a biocide commercially available from Acti-Chem Specialties, Inc.), based on dry polymer weight, was added to the latex. The resulting polymer dispersion had a solids content of 49.5% and a diameter of 122 nm by photocorrelation spectroscopy.

EXAMPLE 2 (E2)

Example 2 was prepared according to the same process and using the same ingredients as in Example 1 except that Example 2 contained 1% (weight percent of active material based on dry polymer weight) DEXTROL® OC-15 (Dexter Chemical L.L.C.) instead of DEXTROL® OC-110. DEXTROL® OC-15 is a mixture of compounds III and IV below:

(III)

(IV)

A monomer pre-emulsion was prepared by emulsifying 336.7 parts water, 5.3 parts CALSOFT® L-40, 10.0 parts DEXTROL® OC-15, 13.3 parts TEXAPON® K1296, 18 parts NaOH solution (10% solution in water), 5 parts itaconic acid, 25 parts acrylamide solution (50% in water), 5 parts acrylic acid, 48 parts ureido methacrylate solution (25% solution in methyl methacrylate), 460 parts n-butyl acrylate and 464.5 parts methyl methacrylate. The initiator solution was prepared by dissolving 2.0 parts ammonium persulfate in 38.0 parts water. A 2-liter stirred glass reactor filled with 498.0 parts deionized water, 3.14 parts of a 33% polystyrene seed latex and 5.0 parts itaconic acid, was purged with nitrogen and heated to 85° C. When the temperature was reached, 4 parts of the initiator solution was injected into the reactor and the remaining initiator solution was continuously fed into the reactor over 3.1 hours. After the charge of the 4 parts of initiator solution, the monomer pre-emulsion was continuously fed into the reactor over 3.0 hours. At the end of the initiator feed, 4.4 parts concentrated ammonia (25% in water) was added into the reactor. The reaction was further allowed to continue for 30 minutes before being cooled down to 70° C.

To further reduce the residual monomer level, a chemical stripping step was conducted. A peroxide solution was prepared consisting of 1.43 parts of t-butylhydroperoxide solution (tBHP, 70% in water) and 25.2 parts water. In addition, a reducing agent solution was prepared consisting of 6.7 parts of sodium acetone bisulfite solution (SABS solution, 24% in water) and 19.9 parts water. The peroxide and reducing agent solutions were fed separately and continuously to the reactor over 0.5 hours. After both feeds, the reactor was maintained at 70° C. for 30 minutes before being cooled down to below 40° C. The pH of the latex was adjusted to 8.4 with concentrated ammonia. 100 ppm of ACTICIDE® MV14, based on dry polymer weight, was added to the latex. The resulting polymer dispersion had a solids content of 50.9% and a diameter of 125 nm by photocorrelation spectroscopy.

EXAMPLE 3 (E3)

Example 3 was prepared according to the same process and using the same ingredients as in Example 1 except that Example 3 contained 1% (weight percent of active material based on dry polymer weight) DEXTROL® OC-22 (Dexter Chemical L.L.C.) instead of DEXTROL® OC-110. DEXTROL® OC-22 is a mixture of compounds V and VI below:

(V)

(VI)

A monomer pre-emulsion was prepared by emulsifying 336.7 parts water, 5.3 parts CALSOFT® L-40, 10.0 parts DEXTROL® OC-22, 13.3 parts TEXAPON® K1296, 18 parts NaOH solution (10% solution in water), 5 parts itaconic acid, 25 parts acrylamide solution (50% in water), 5 parts acrylic acid, 48 parts ureido methacrylate solution (25% solution in methyl methacrylate), 460 parts n-butyl acrylate and 464.5 parts methyl methacrylate. The initiator solution was prepared by dissolving 2.0 parts ammonium persulfate in 38.0 parts water. A 2-liter stirred glass reactor filled with 498.0 parts deionized water, 3.14 parts of a 33% polystyrene seed latex and 5.0 parts itaconic acid, was purged with nitrogen and heated to 85° C. When the temperature was reached, 4 parts of the initiator solution was injected into the reactor and the remaining initiator solution was continuously fed into the reactor over 3.1 hours. After the charge of the 4 parts of initiator solution, the monomer pre-emulsion was continuously fed into the reactor over 3.0 hours. At the end of the initiator feed, 4.4 parts concentrated ammonia (25% in water) was added into the reactor. The reaction was further allowed to continue for 30 minutes before being cooled down to 70° C.

To further reduce the residual monomer level, a chemical stripping step was conducted. A peroxide solution was prepared consisting of 1.43 parts of t-butylhydroperoxide solution (tBHP, 70% in water) and 25.2 parts water. In addition, a reducing agent solution was prepared consisting of 6.7 parts of sodium acetone bisulfite solution (SABS solution, 24% in water) and 19.9 parts water. The peroxide and reducing agent solutions were fed separately and continuously to the reactor over 0.5 hours. After both feeds, the reactor was maintained at 70° C. for 30 minutes before being cooled down to below 40° C. The pH of the latex was adjusted to 8.3 with concentrated ammonia. 100 ppm of ACTICIDE® MV14, based on dry polymer weight, was added to the latex. The resulting polymer dispersion had a solids content of 49.9% and a diameter of 117 nm by photocorrelation spectroscopy.

EXAMPLE 4 (E4)

Example 4 was prepared according to the same process and using the same ingredients as in Example 1 except that Example 4 contained 1% (weight percent of active material based on dry polymer weight) DEXTROL® OC-40 (Dexter Chemical L.L.C.) instead of DEXTROL® OC-110. DEXTROL® OC-40 is a mixture of compounds VII and VIII below:

A monomer pre-emulsion was prepared by emulsifying 336.7 parts water, 5.3 parts CALSOFT® L-40, 10.0 parts DEXTROL® OC-40, 13.3 parts TEXAPON® K1296, 18 parts NaOH solution (10% solution in water), 5 parts itaconic acid, 25 parts acrylamide solution (50% in water), 5 parts acrylic acid, 48 parts ureido methacrylate solution (25% solution in methyl methacrylate), 460 parts n-butyl acrylate and 464.5 parts methyl methacrylate. The initiator solution was prepared by dissolving 2.0 parts ammonium persulfate in 38.0 parts water. A 2-liter stirred glass reactor filled with 498.0 parts deionized water, 3.14 parts of a 33% polystyrene seed latex and 5.0 parts itaconic acid, was purged with nitrogen and heated to 85° C. When the temperature was reached, 4 parts of the initiator solution was injected into the reactor and the remaining initiator solution was continuously fed into the reactor over 3.1 hours. After the charge of the 4 parts of initiator solution, the monomer pre-emulsion was continuously fed into the reactor over 3.0 hours. At the end of the initiator feed, 4.4 parts concentrated ammonia (25% in water) was added into the reactor. The reaction was further allowed to continue for 30 minutes before being cooled down to 70° C.

To further reduce the residual monomer level, a chemical stripping step was conducted. A peroxide solution was prepared consisting of 1.43 parts of t-butylhydroperoxide solution (tBHP, 70% in water) and 25.2 parts water. In addition, a reducing agent solution was prepared consisting of 6.7 parts of sodium acetone bisulfite solution (SABS solution, 24% in water) and 19.9 parts water. The peroxide and reducing agent solutions were fed separately and continuously to the reactor over 0.5 hours. After both feeds, the reactor was maintained at 70° C. for 30 minutes before being cooled down to below 40° C. The pH of the latex was adjusted to 8.5 with concentrated ammonia. 100 ppm of ACTICIDE® MV14, based on dry polymer weight, was added to the latex. The resulting polymer dispersion had a solids content of 50.28% and a diameter of 117 nm by photocorrelation spectroscopy.

EXAMPLE 5 (E5)

Example 5 was prepared according to the same process and using the same ingredients as in Example 1 except that Example 5 contained 1% (weight percent of active material based on dry polymer weight) DEXTROL® OC-60 (Dexter Chemical L.L.C.) instead of DEXTROL® OC-110. DEXTROL® OC-60 is a mixture of compounds IX and X below:

A monomer pre-emulsion was prepared by emulsifying 336.7 parts water, 5.3 parts CALSOFT® L-40, 10.0 parts DEXTROL® OC-60, 13.3 parts TEXAPON® K1296, 18 parts NaOH solution (10% solution in water), 5 parts itaconic acid, 25 parts acrylamide solution (50% in water), 5 parts acrylic acid, 48 parts ureido methacrylate solution (25% solution in methyl methacrylate), 460 parts n-butyl acrylate and 464.5 parts methyl methacrylate. The initiator solution was prepared by dissolving 2.0 parts ammonium persulfate in 38.0 parts water. A 2-liter stirred glass reactor filled with 498.0 parts deionized water, 3.14 parts of a 33% polystyrene seed latex and 5.0 parts itaconic acid, was purged with nitrogen and heated to 85° C. When the temperature was reached, 4 parts of the initiator solution was injected into the reactor and the remaining initiator solution was continuously fed into the reactor over 3.1 hours. After the charge of the 4 parts of initiator solution, the monomer pre-emulsion was continuously fed into the reactor over 3.0 hours. At the end of the initiator feed, 4.4 parts concentrated ammonia (25% in water) was added into the reactor. The reaction was further allowed to continue for 30 minutes before being cooled down to 70° C.

To further reduce the residual monomer level, a chemical stripping step was conducted. A peroxide solution was prepared consisting of 1.43 parts of t-butylhydroperoxide solution (tBHP, 70% in water) and 25.2 parts water. In addition, a reducing agent solution was prepared consisting of 6.7 parts of sodium acetone bisulfite solution (SABS solution, 24% in water) and 19.9 parts water. The peroxide and reducing agent solutions were fed separately and continuously to the reactor over 0.5 hours. After both feeds, the reactor was maintained at 70° C. for 30 minutes before being cooled down to below 40° C. The pH of the latex was adjusted to 8.4 with concentrated ammonia. 100 ppm of ACTICIDE® MV14, based on dry polymer weight, was added to the latex. The resulting polymer dispersion had a solids content of 50.40% and a diameter of 115 nm by photocorrelation spectroscopy.

EXAMPLE 6 (E6)

Example 6 was prepared according to the same process and using the same ingredients as in Example 1 except that Example 6 contained 1% (weight percent of active material based on dry polymer weight) DEXTROL® OC-75A (Dexter Chemical L.L.C.) instead of DEXTROL® OC-110. DEXTROL® OC-75A is a mixture of compounds XI and XII below:

A monomer pre-emulsion was prepared by emulsifying 336.7 parts water, 5.3 parts CALSOFT® L-40, 10.0 parts DEXTROL® OC-75A, 13.3 parts TEXAPON® K1296, 18 parts NaOH solution (10% solution in water), 5 parts itaconic acid, 25 parts acrylamide solution (50% in water), 5 parts acrylic acid, 48 parts ureido methacrylate solution (25% solution in methyl methacrylate), 460 parts n-butyl acrylate and 464.5 parts methyl methacrylate. The initiator solution was prepared by dissolving 2.0 parts ammonium persulfate in 38.0 parts water. A 2-liter stirred glass reactor filled with 498.0 parts deionized water, 3.14 parts of a 33% polystyrene seed latex and 5.0 parts itaconic acid, was purged with nitrogen and heated to 85° C. When the temperature was reached, 4 parts of the initiator solution was injected into the reactor and the remaining initiator solution was continuously fed into the reactor over 3.1 hours. After the charge of the 4 parts of initiator solution, the monomer pre-emulsion was continuously fed into the reactor over 3.0 hours. At the end of the initiator feed, 4.4 parts concentrated ammonia (25% in water) was added into the reactor. The reaction was further allowed to continue for 30 minutes before being cooled down to 70° C.

To further reduce the residual monomer level, a chemical stripping step was conducted. A peroxide solution was prepared consisting of 1.43 parts of t-butylhydroperoxide solution (tBHP, 70% in water) and 25.2 parts water. In addition, a reducing agent solution was prepared consisting of 6.7 parts of sodium acetone bisulfite solution (SABS solution, 24% in water) and 19.9 parts water. The peroxide and reducing agent solutions were fed separately and continuously to the reactor over 0.5 hours. After both feeds, the reactor was maintained at 70° C. for 30 minutes before being cooled down to below 40° C. The pH of the latex was adjusted to 8.3 with concentrated ammonia. 100 ppm of ACTICIDE® MV14, based on dry polymer weight, was added to the latex. The resulting polymer dispersion had a solids content of 46.56% and a diameter of 117 nm by photocorrelation spectroscopy.

Comparative Example 1 (CE1)

Comparative Example 1 was prepared according to the same process and using the same ingredients as in Example 1, except that Comparative Example 1 contained no DEX-TROL® surfactants. Comparative Example 1 contained 0.5% of CALSOFT® L-40S versus 0.2% in E1 through E3 (weight percent of active material based on dry polymer weight).

A monomer pre-emulsion was prepared by emulsifying 331.8 parts water, 13.2 parts CALSOFT® L-40, 13.3 parts TEXAPON® K1296, 18 parts NaOH solution (10% solution in water), 5 parts itaconic acid, 25 parts acrylamide solution (50% in water), 5 parts acrylic acid, 48 parts ureido methacrylate solution (25% solution in methyl methacrylate), 460 parts n-butyl acrylate and 464.5 parts methyl methacrylate. The initiator solution was prepared by dissolving 2.0 parts ammonium persulfate in 38.0 parts water. A 2-liter stirred glass reactor filled with 498.0 parts deionized water, 3.14 parts of a 33% polystyrene seed latex and 5.0 parts itaconic acid, was purged with nitrogen and heated to 85° C. When the temperature was reached, 4 parts of the initiator solution was injected into the reactor and the remaining initiator solution was continuously fed into the reactor over 3.1 hours. After the charge of the 4 parts of initiator solution, the monomer pre-emulsion was continuously fed into the reactor over 3.0 hours. At the end of the initiator feed, 4.4 parts concentrated ammonia (25% in water) was added into the reactor. The reaction was further allowed to continue for 30 minutes before being cooled down to 70° C.

To further reduce the residual monomer level, a chemical stripping step was conducted. A peroxide solution was prepared consisting of 1.43 parts of t-butylhydroperoxide solution (tBHP, 70% in water) and 25.2 parts water. In addition, a reducing agent solution was prepared consisting of 6.7 parts of sodium acetone bisulfite solution (SABS solution, 24% in water) and 19.9 parts water. The peroxide and reducing agent solutions were fed separately and continuously to the reactor over 0.5 hours. After both feeds, the reactor was maintained at 70° C. for 30 minutes before being cooled down to below 40° C. The pH of the latex was adjusted to 8.4 with concentrated ammonia. 100 ppm of ACTICIDE® MV14, based on dry polymer weight, was added to the latex. The resulted polymer dispersion has a solid content of 50.3% and a diameter of 122 nm by photocorrelation spectroscopy.

Paint Formulation

The following semi gloss, $TiO_2$ slurry-based paint formulation was used for evaluating the paint performances and the state of dispersion of $TiO_2$ particles in paints prepared using the latices of Examples 1–6 and Comparative Example 1.

| Ingredients | Parts by Weight) |
|---|---|
| Water | 64.0 |
| Propylene Glycol | 65.0 |
| 2-Amino-2-Methyl-Propanol (AMP-95) | 2.0 |
| TAMOL ® 731[1] | 5.0 |
| FOAMASTER ® VL[2] | 1.0 |
| PROXEL ® GXL[3] | 3.0 |
| $TiO_2$ Slurry (TI-PURE ® R-746[4]) | 350.3 |

The above components were mixed at 1000 rpm for 20 minutes and then the following components were added to the mixer:

| | |
|---|---|
| Latex (50%) | 490.0 |
| TEXANOL ® [5] | 24.5 |
| FOAMASTER ® VL | 1.0 |
| ACRYSOL ® RM 2020[6] | 28.4 |
| Water | 47.0 |

[1]TAMOL ® 731 is a dispersant based on a sodium salt of a hydrophobic copolymer commercially available from Rohm and Haas.
[2]FOAMASTER ® VL is a defoamer based on a proprietary blend of esters, oils, and silica derivatives commercially available from Henkel Corporation.
[3]PROXEL ® GXL is a biocide based on 1,2-benziosothiazolin-3-one commercially available from Zeneca.
[4]TI-PURE ® R-746 is a $TiO_2$ slurry with 76.5% solids content commercially available from DuPont.
[5]TEXANOL ® is a 2,2,4-trimethyl-1,3-pentanediol mono (2-methylpropanoate) coalescing agent commercially available from Eastman Chemicals.
[6]ACRYSOL ® RM 2020 is a hydrophobically modified ethoxylated urethane block copolymer for adjusting high-shear viscosity (ICI) commercially available from Rohm and Haas.

Test Methods

Stormer Viscosity (in KU, Krebs Units): The Stormer viscosity was measured according to ASTM D 562-81.

ICI Viscosity (in Poise): The high shear ICI viscosity was measured according to ASTM D 4287-94.

Freeze-Thaw Stability: The high freeze-thaw stability of the paints was tested according to ASTM D 2243. The freezer temperature was set at −18° C. Stormer viscosities were measured after each freeze-thaw cycle, if the paint did not coagulate.

Draw-Down of Films: After the third freeze-thaw cycle, a draw-down of the paint was made on white sealed paper (Plain Leneta white paper chart) with a 7 MILS (180 μm thickness) blade. A pass or failure note was given based on the grit level in the dried paint film. A paint film with sporadic microcoagulum was rated a "pass" and a paint film with a large amount of coagulum was rated a "fail". The rating gives information on freeze-thaw stability of the paint to supplement the stormer viscosity measurement.

Gloss: Gloss measurement was carried out based on ASTM D 523. Wet paints of 3 MILS thickness (75 μm) were drawn on Leneta PVC scrub panels and allowed to dry in a climate-controlled room (22° C. and 50% RH) for 72 hours. At least three readings were taken in various locations. Gloss values of 20° and 60° geometries were recorded for the semi gloss paints.

Contrast Ratio: Contrast Ratio was measured based on ASTM D 2805-96a. Wet paints of 3 MILS thickness (75 μm) were drawn on Leneta Opacity charts and allowed to dry in a climate-controlled room (22° C. and 50% RH) for 72 hours. At least three readings of reflectance were taken in different locations of the test area and mean values were calculated. The contrast ratio is the ratio of the reflectance of a paint film on a black area to that of an identical film on a white area.

Paint Test Results

Figure 1:
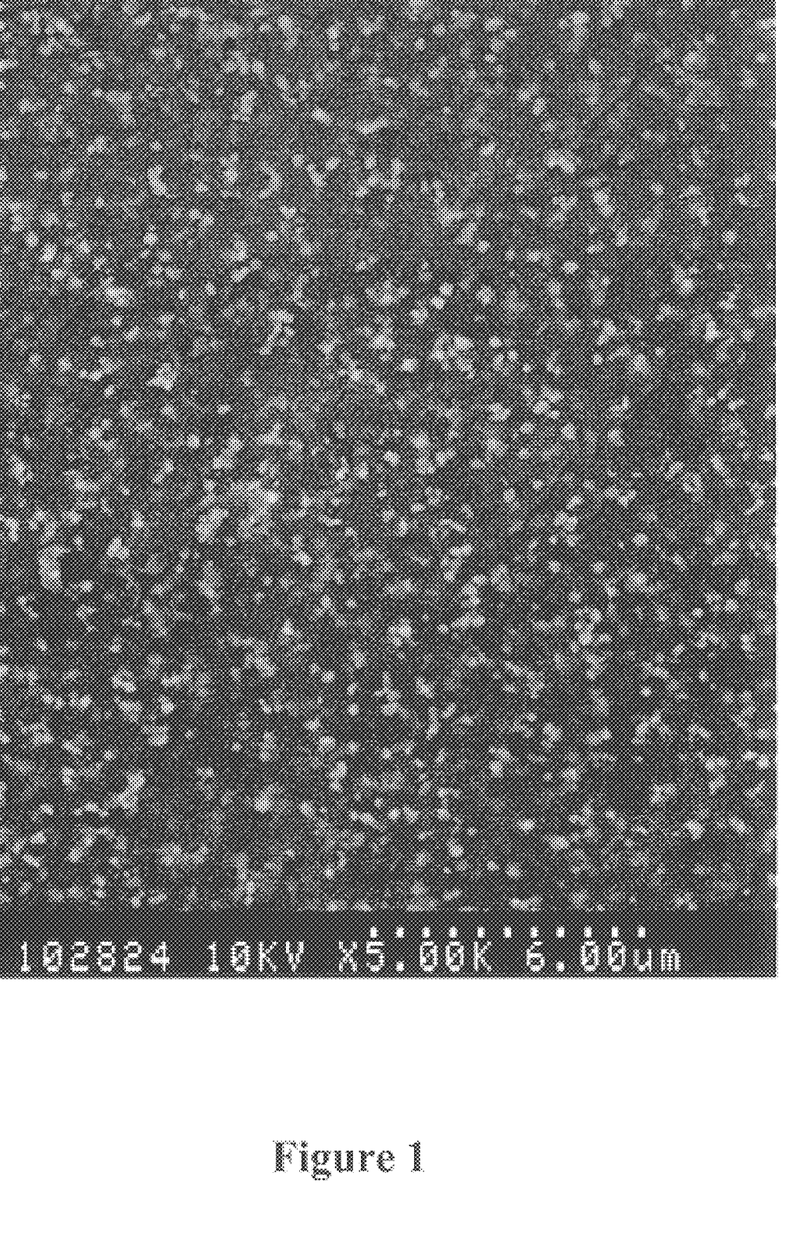
FIG. 1 is a cryogenic SEM of a semi gloss paint formulation prepared using the latex prepared according to Example 1.
Figure 2:
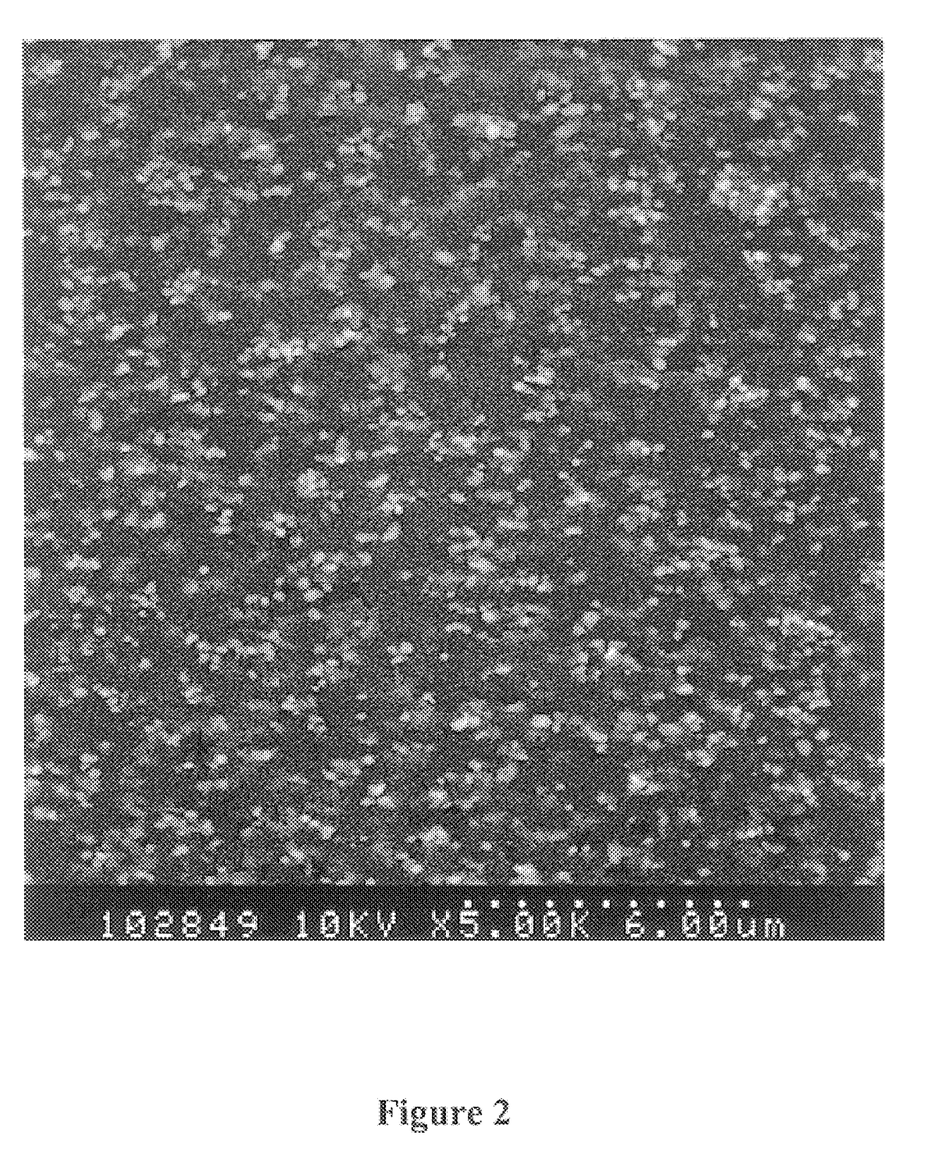
FIG. 2 is a cryogenic SEM of a semi gloss paint formulation prepared using the latex prepared according to Example 2.
Figure 3:
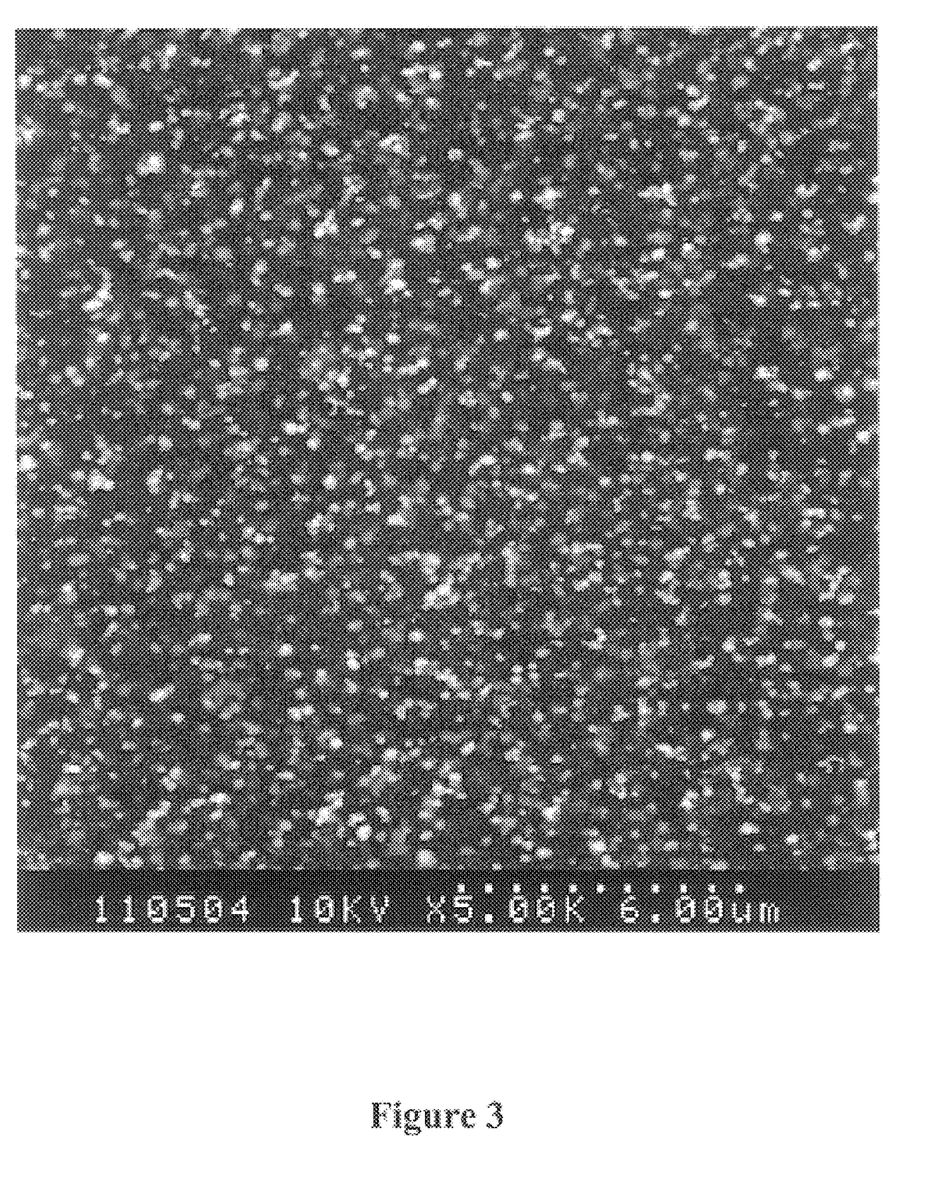
FIG. 3 is a cryogenic SEM of a semi gloss paint formulation prepared using the latex prepared according to Example 3.
Figure 4:
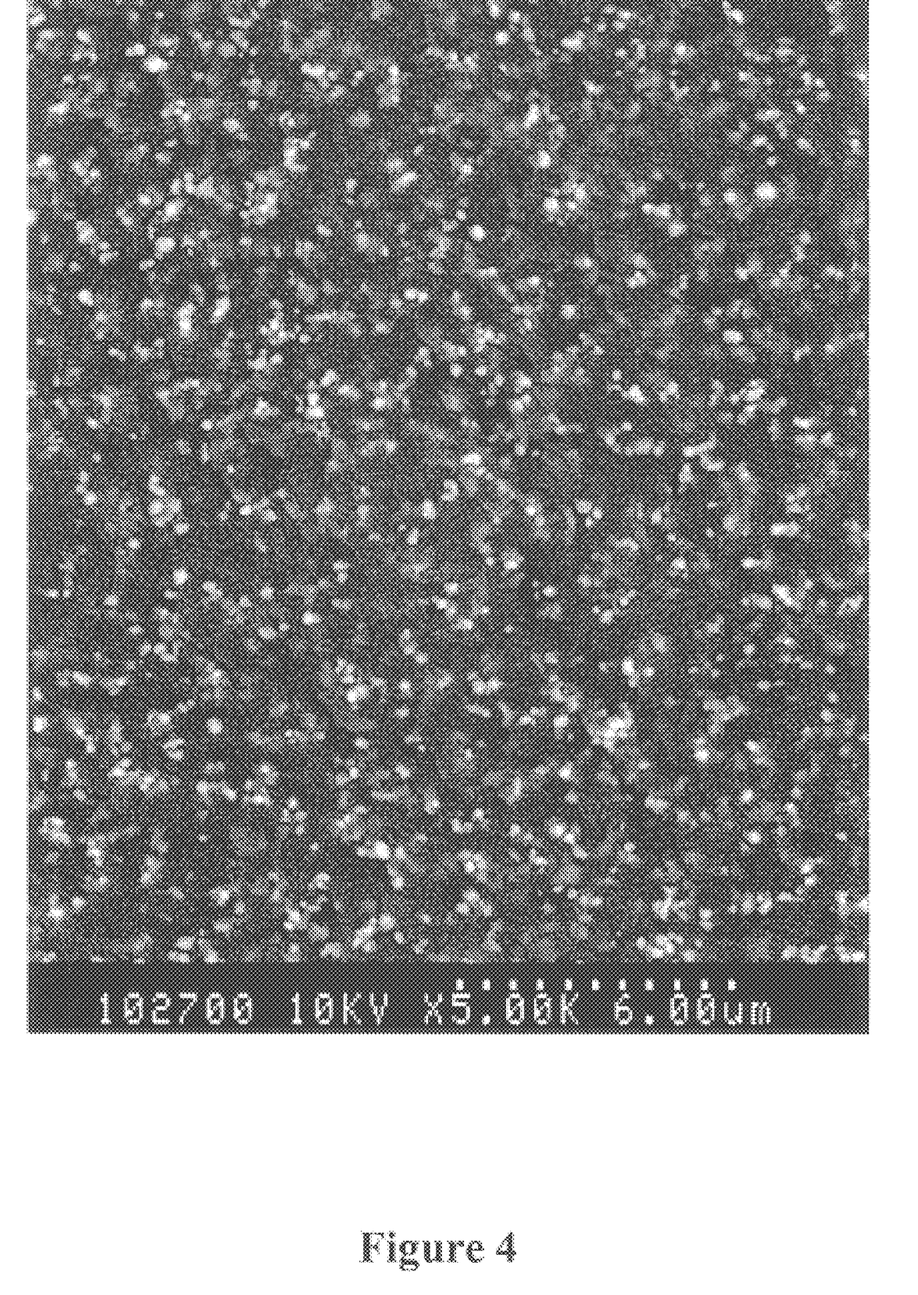
FIG. 4 is a cryogenic SEM of a semi gloss paint formulation prepared using the latex prepared according to Example 4.
Figure 5:
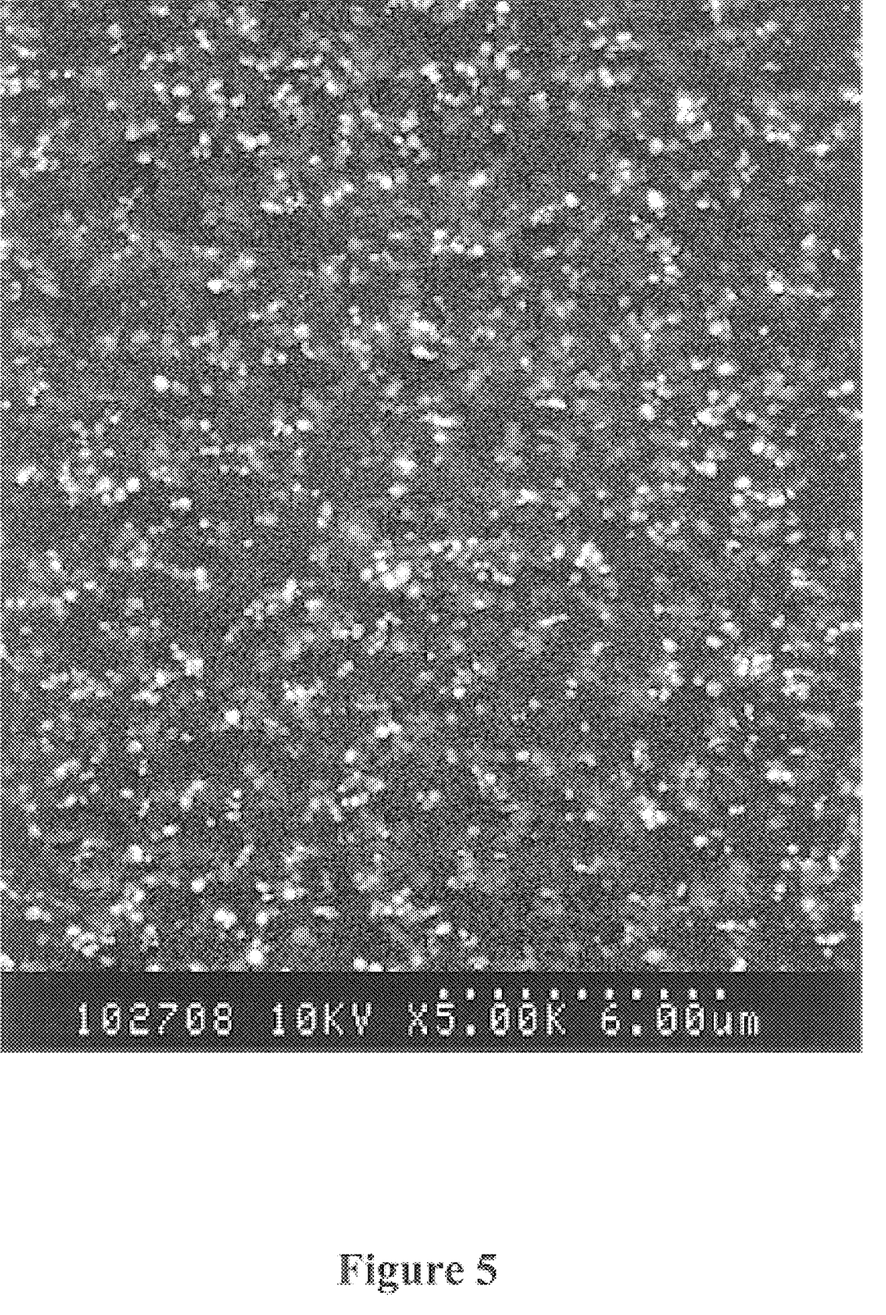
FIG. 5 is a cryogenic SEM of a semi gloss paint formulation prepared using the latex prepared according to Example 5.
Figure 6:
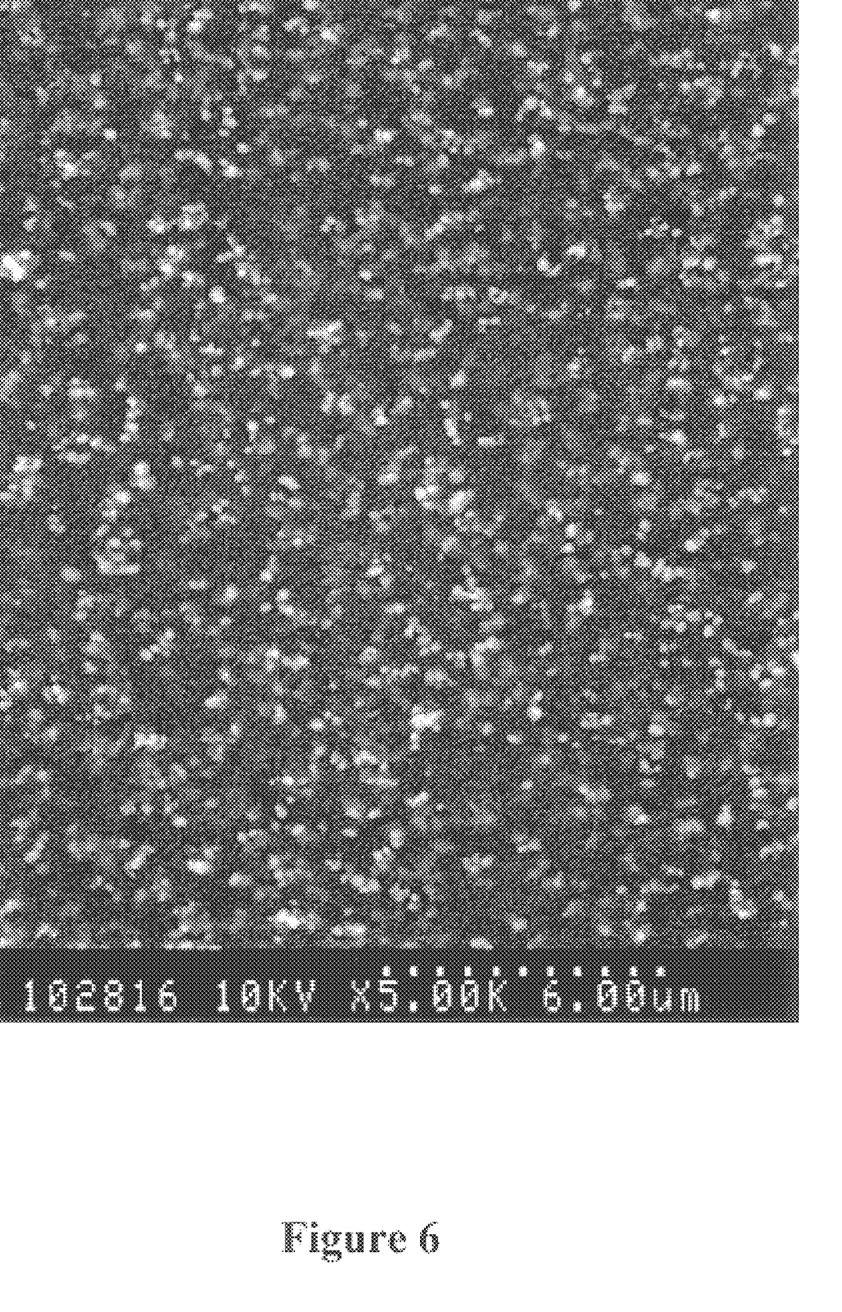
FIG. 6 is a cryogenic SEM of a semi gloss paint formulation prepared using the latex prepared according to Example 6.
Figure 7:
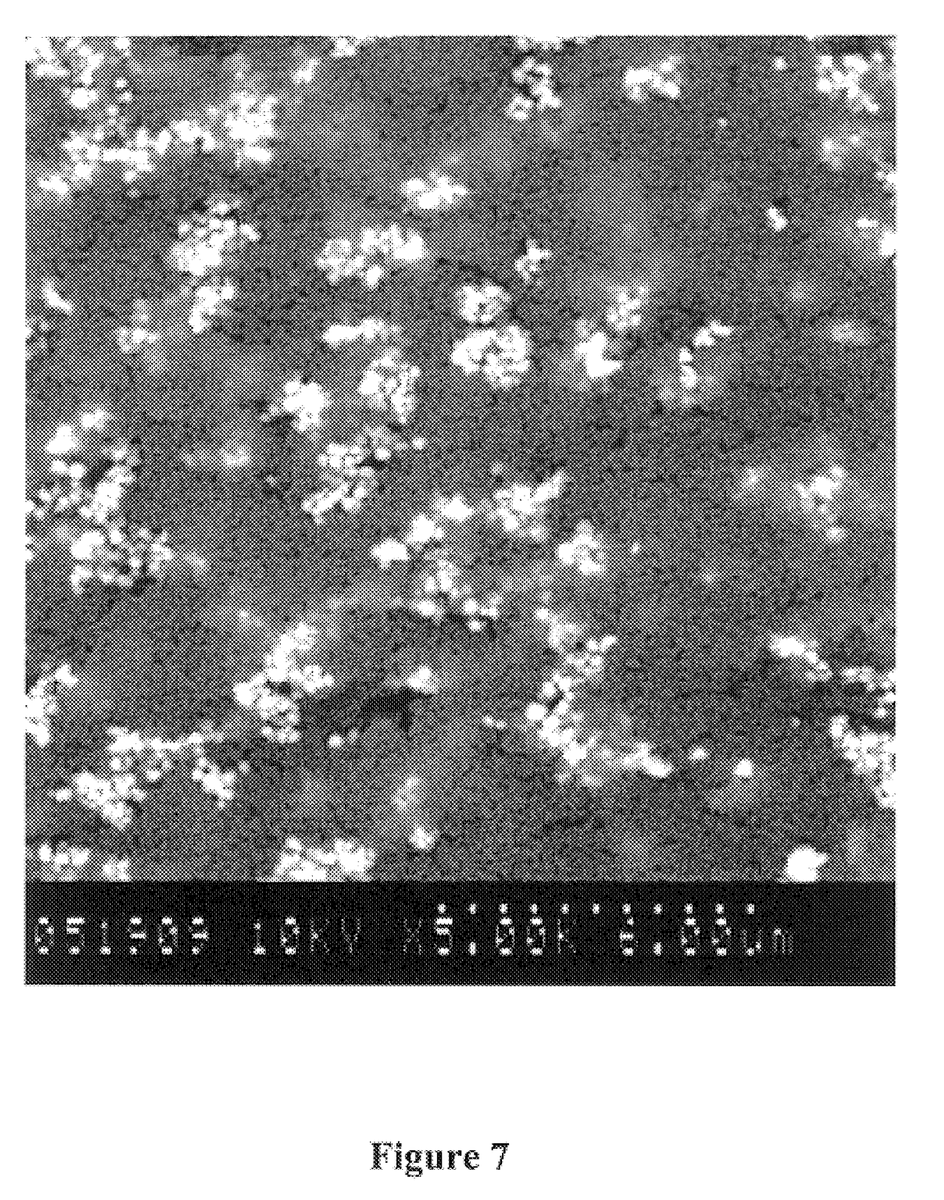
FIG. 7 is a cryogenic SEM of a semi gloss paint formulation prepared using the latex prepared according to Comparative Example 1.

The test results of the semi gloss paints based on the latices from Examples 1–6 and Comparative Example 1 are summarized in Table 1.

respectively, show that the semi gloss paints based on the polymer latices of Examples 1–6 have improved dispersion of the $TiO_2$ particles than the semi gloss paint based on the polymer latex of Comparative Example 1 illustrated in FIG. 7, which contains clusters of $TiO_2$ particles. As the results in Table 1 demonstrate, the semi gloss paints based on Examples 1–6 not only exhibit better $TiO_2$ dispersion but also exhibit improved performance over the semi gloss paint based on Comparative Example 1.

It is understood that upon reading the above description of the present invention, one skilled in the art could make changes and variations therefrom. These changes and variations are included in the spirit and scope of the following appended claims.

That which is claimed:

1. A aqueous coating composition, comprising:
   (a) at least one polyoxyalkylene phosphate surfactant having the following structure:

wherein m is 1 or 2, n is an integer from 1 to 100, $R^1$ is C1–C5 alkyl, O—$R^2$ is an alkylphenol residue wherein $R^2$ has the structure $C_6H_4$—$C_pH_{2p+1}$ or O—$R^2$ is a linear or branched alkyl alcohol residue wherein $R^2$ has the structure $C_pH_{2p+1}$, and p is an integer from 1 to 30, with the proviso that $R^1$ is not only C2 alkyl and that $R^1$ is not only C2 alkyl and C3 alkyl;

TABLE 1

|  | Paint #1 Based on E1 | Paint #2 Based on E2 | Paint #3 Based on E3 | Paint #4 Based on E4 | Paint #5 Based on E5 | Paint #6 Based on E6 | Paint #7 Based on CE1 |
|---|---|---|---|---|---|---|---|
| Stormer Viscosity (KU) | 87 | 84 | 83 | 84 | 79 | 86 | 82 |
| ICI Viscosity (poise) | 1.44 | 1.39 | 1.48 | 1.42 | 1.38 | 1.59 | 1.18 |
| Freeze-Thaw Stability (KU after 1,2,3,4,5 cycles) | 86/90/88/93/92 | 86/89/86/91/90 | 86/88/88/89/90 | 86/88/86/88/86 | 82/85/82/84/83 | 88/89/88/90/87 | 86/89/87/88/87 |
| Grit in Draw Down Films after 3 Freeze-Thaw Cycles | Pass | Pass | Pass | Pass | Pass | Pass | Pass |
| Gloss @ 20°/60° | 27/74 | 22/72 | 27/75 | 29/77 | 22/71 | 28/74 | 10/55 |
| Contrast Ratio | 97.9 | 97.4 | 98.3 | 98.9 | 97.1 | 98.3 | 96.4 |

The test results in Table 1 show that the semi gloss paints based on the polymer latices of Examples 1–6 have higher high-shear (ICI) viscosities, higher gloss and higher contrast ratios (higher hiding power) than the control paint based on the latex of the Comparative Example 1 as is desirable in paint formulations. Furthermore, the semi gloss paints based on the polymer latices of Examples 1–6 have low-shear (Stormer) viscosities that are comparable to the low-shear viscosity for the paint based on the latex of Comparative Example 1.

The cryogenic SEM pictures of the paints are provided in FIGS. 1–7. FIGS. 1–6, which correspond to the semi gloss paints based on the polymer latices of Examples 1–6, (b) at least one latex polymer;
(c) at least one inorganic pigment; and
(d) water.

2. The composition according to claim 1, wherein $R^1$ is selected from the group consisting of C1 alkyl, C3 alkyl, C4 alkyl, C5 alkyl, and combinations thereof.

3. The composition according to claim 1, wherein n is from 2 to 30.

4. The composition according to claim 1, wherein n is from 3 to 15.

5. The composition according to claim 1, wherein p is an integer from 8 to 18.-

6. The composition according to claim 1 further comprising a polyoxyethylene surfactant having the following structure:

wherein m is 1 or 2, n is an integer from 1 to 100, and O—$R^2$ is an alkylphenol residue wherein $R^2$ has the structure $C_6H_4$—$C_pH_{2p+1}$ or O—$R^2$ is a linear or branched alkyl alcohol residue wherein $R^2$ has the structure $C_pH_{2p+1}$, and p is an integer from 1 to 30.

7. The composition according to claim 6, wherein the the polyoxyethylene surfactant has the following structure:

wherein m is 1 or 2, n is an integer from 2 to 30, and O—R is at least one of i) an alkylphenol residue wherein R has the structure $C_6H_4$—$C_pH_{2p+1}$ and p is an integer from 8 to 18, and ii) an alkyl alcohol residue wherein R has the structure $C_pH_{2p+1}$ and p is an integer from 8 to 18.

8. The composition according to claim 1, wherein $R^2$ is nonylphenyl or tridecyl.

9. The composition according to claim 1, wherein the inorganic pigment is selected from the group consisting of $TiO_2$, clay, $CaCO_3$, talc, barytes, zinc oxide and zinc sulfite.

10. The composition according to claim 1, wherein the inorganic pigment includes $TiO_2$.

11. The composition according to claim 1, wherein the surfactant is incorporated in the latex.

12. The composition according to claim 1, wherein the at least one latex polymer is selected from the group consisting of pure acrylics, styrene acrylics, vinyl acrylics and acrylated ethylene vinyl acetate copolymers.

13. The composition according to claim 1, wherein the at least one latex polymer includes a pure acrylic.

14. The composition according to claim 13, wherein the at least one latex polymer is derived from at least one acrylic monomer selected from the group consisting of acrylic acid, acrylic acid esters, methacrylic acids, and methacrylic acid esters.

15. The composition according to claim 14, wherein the at least one latex polymer is further derived from one or more monomers selected from the group consisting of styrene, α-methyl styrene, vinyl chloride, acrylonitrile, methacrylonitrile, ureido methacrylate, vinyl acetate, itaconic acid, crotonic acid, maleic acid, fumaric acid, ethylene, and C4–C8 conjugated dienes.

16. The composition according to claim 1, further comprising at least one anti-freezing agent.

17. The composition according to claim 1, further comprising one or more additives selected from the group consisting of plasticizers, drying retarders, dispersants, surfactants or wetting agents, rheology modifiers, defoamers, thickeners, coalescing agents, biocides, mildewcides, colorants, waxes, perfumes and co-solvents.

18. The composition according to claim 1, wherein the latex polymer is a butyl acrylate/methyl methacrylate copolymer.

19. A method of preparing a aqueous coating composition, comprising the step of: mixing at least one polyoxyalkylene phosphate surfactant having the following structure:

wherein m is 1 or 2, n is an integer from 1 to 100, $R^1$ is C1–C5 alkyl, O—$R^2$ is an alkylphenol residue wherein $R^2$ has the structure $C_6H_4$—$C_pH_{2p+1}$ or O—$R^2$ is a linear or branched alkyl alcohol residue wherein $R^2$ has the structure $C_pH_{2p+1}$, and p is an integer from 1 to 30, with the proviso that $R^1$ is not only C2 alkyl and that $R^1$ is not only C2 alkyl and C3 alkyl; at least one latex polymer; and at least one inorganic pigment.

20. The method according to claim 19, wherein said mixing step comprises mixing at least one inorganic pigment in slurry form.

21. The method according to claim 20, wherein said mixing step comprises blending the surfactant with the at least one inorganic pigment in slurry form prior to mixing the surfactant and at least one inorganic pigment with the at least one latex polymer.

22. The method according to claim 19, wherein said mixing step comprises mixing at least one surfactant wherein $R^1$ is selected from the group consisting of C1 alkyl, C3 alkyl, C4 alkyl, C5 alkyl, and combinations thereof.

23. The method according to claim 19, wherein said mixing step comprises mixing at least one surfactant wherein n is from 2 to 30.

24. The method according to claim 19, wherein said mixing step comprises mixing at least one surfactant wherein n is from 3 to 15.

25. The method according to claim 19, wherein said mixing step comprises mixing at least one surfactant wherein p is an integer from 8 to 18.

26. The method according to claim 19, wherein said mixing step further comprises mixing at least one polyoxyethylene surfactant having the following structure:

where m is 1 or 2, n is an integer from 1 to 100, and O—$R^2$ is an alkylphenol residue wherein $R^2$ has the structure $C_6H_4$—$C_pH_{2p+1}$ or O—$R^2$ is a linear or branched alkyl alcohol residue wherein $R^2$ has the structure $C_pH_{2p+1}$, and p is an integer from 1 to 30.

27. The method according to claim 26, wherein the polyoxyethylene surfactant has the following structure:

where m is 1 or 2, n is an integer from 2 to 30, and O—R is at least one of i) an alkylphenol residue wherein R has the structure $C_6H_4$—$C_pH_{2p+1}$ and p is an integer from 8 to 18, and ii) is an alkyl alcohol residue wherein R has the structure $C_pH_{2p+1}$ and p is an integer from 8 to 18.

28. The method according to claim 19, wherein said mixing step comprises mixing at least one surfactant wherein $R^2$ is nonylphenyl or tridecyl.

29. The method according to claim 19, wherein said mixing step comprises mixing at least one inorganic pigment wherein the inorganic pigment is selected from the group consisting of TiO$_2$, clay, CaCO$_3$, talc, barytes, zinc oxide and zinc sulfite.

30. The method according to claim 19, wherein the inorganic pigment includes TiO$_2$.

31. The method according to claim 19, wherein said mixing step comprises mixing at least one latex polymer selected from the group consisting of pure acrylics, styrene acrylics, vinyl acrylics and acrylated ethylene vinyl acetate copolymers.

32. The method according to claim 19, wherein the at least one latex polymer includes a pure acrylic.

33. The method according to claim 19, wherein the at least one latex polymer is derived from at least one acrylic monomer selected from the group consisting of acrylic acid, acrylic acid esters, methacrylic acids, and methacrylic acid esters.

34. The method according to claim 33, wherein the at least one latex polymer is further derived from one or more monomers selected from the group consisting of styrene, α-methyl styrene, vinyl chloride, acrylonitrile, methacrylonitrile, ureido methacrylate, vinyl acetate, itaconic acid, crotonic acid, maleic acid, fumaric acid, ethylene, and C4–C8 conjugated dienes.

35. The method according to claim 19, wherein said mixing step comprises further mixing at least one anti-freezing agent.

36. The method according to claim 19, wherein said mixing step comprises further mixing at least one additive selected from the group consisting of plasticizers, drying retarders, dispersants, surfactants or wetting agents, rheology modifiers, defoamers, thickeners, coalescing agents, biocides, mildewcides, colorants, waxes, perfumes and co-solvents.

37. The method according to claim 19, further comprising the step of preparing the polymer latex binder using emulsion polymerization by feeding monomers to a reactor in the presence of at least one initiator and the at least one surfactant and polymerizing the monomers to produce the latex binder, wherein said mixing step comprises mixing the at least one inorganic pigment with the resulting latex binder to prepare the aqueous coating composition.

38. The method according to claim 37, wherein said step of preparing the polymer latex binder comprises:

preparing an initiator solution comprising the initiator;
preparing a monomer pre-emulsion comprising monomers and the surfactant;
adding the initiator solution to a reactor; and
adding the monomer pre-emulsion to the reactor.

39. The method according to claim 38, wherein at least a portion of said initiator solution is added to the reactor prior to adding the monomer pre-emulsion.

40. The method according to claim 38, further comprising the step of adding a seed latex to the reactor prior to adding the initiator and adding the monomer pre-emulsion.

41. The method according to claim 38, further comprising the step of chemically stripping the latex binder by adding a peroxide and a reducing agent to the latex binder thereby decreasing the residual monomer content of the latex binder.

42. The method according to claim 38, wherein said preparing step comprises feeding monomers to a reactor comprising at least one acrylic monomer selected from the group consisting of acrylic acid, acrylic acid esters, methacrylic acids, and methacrylic acid esters.

43. The method according to claim 39, wherein said preparing step comprises feeding monomers to a reactor further comprising one or more monomers selected from the group consisting of styrene, α-methyl styrene, vinyl chloride, acrylonitrile, methacrylonitrile, ureido methacrylate, vinyl acetate, itaconic acid, crotonic acid, maleic acid, fumaric acid, ethylene, and C4–C8 conjugated dienes.

44. In a method for limiting the clustering of TiO$_2$ particles in a aqueous coating composition comprising a polymer latex and water, the improvement comprising adding at least one polyoxyalkylene phosphate surfactant having the following structure:

wherein m is 1 or 2, n is an integer from 1 to 100, R$^1$ is C1–C5 alkyl, O—R$^2$ is an alkylphenol residue wherein R$^2$ has the structure —C$_6$H$_4$—C$_p$H$_{2p+1}$ or O—R$^2$ is a linear or branched alkyl alcohol residue wherein R$^2$ has the structure —C$_p$H$_{2p+1}$ and p is an integer from 1 to 30, with the proviso that R$^1$ is not only C2 alkyl and that R$^1$ is not only C2 alkyl and C3 alkyl, to the aqueous coating composition.

* * * * *